Patented Sept. 27, 1932

1,879,337

UNITED STATES PATENT OFFICE

EMIL LAAGE, OF UERDINGEN, GERMANY, ASSIGNOR TO I. G. FARBENINDUSTRIE AKTIENGESELLSCHAFT, OF FRANKFORT-ON-THE-MAIN, GERMANY

PROCESS FOR THE MANUFACTURE OF α-NAPHTHOL

No Drawing. Application filed April 7, 1930, Serial No. 442,445, and in Germany April 10, 1929.

The invention relates to an improved process of preparing 1-hydroxynaphthalene (α-naphthol).

I have found that α-keto-tetrahydronaphthalene, which is represented by the formula

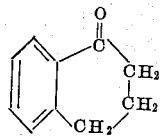

and may be regarded as tautomeric with 3-4-dihydro-1-hydroxynaphthalene may easily be converted into α-naphthol by treating it with sulphur, according to the equation $$C_{10}H_{10}O + S = C_{10}H_8O + H_2S,$$

the amount of sulphur not exceeding the molar amount calculated upon the amount of the α-ketotetrahydronaphthalene.

In carrying out my invention, I heat the α-keto-tetrahydronaphthalene together with sulphur to an elevated temperature until the evolution of hydrogen sulphide ceases. I prefer to take the α-keto-tetrahydronaphthalene in some excess over the amount calculated stoichiometrically, the unchanged portion serving as solvent. The dehydrogenating action of the sulphur may be promoted by the addition of selenium, tellurium, arsenic, antimony or a heavy metal, such as copper, silver, zinc, tin, preferably in a finely divided state, or an oxide or sulphide of such a metal.

Furthermore, organic catalysts of the kind used as accelerators in rubber curing processes, for example, diphenylguanidine, mercaptobenzothiazole, hexamethylene-tetramine and other condensation products of aldehydes and amino compounds may be added.

The invention is illustrated by the following example, without being restricted to it:

A mixture of 160 parts by weight of α-keto-tetrahydronaphthalene and 32 parts of sulphur are heated to 190-200° C. during about one hour. The hydrogen sulphide escaping from the reaction vessel is absorbed by any known means or reconverted into sulphur, for instance, by moderate catalytic oxidation. When no more hydrogen sulphide is evolved, the α-naphthol formed is separated by fractional distillation under diminished pressure, the excess of α-keto-tetrahydronaphthalene being recovered from the first runnings. The α-naphthol may be further purified by recrystallization or by dissolving it in dilute caustic alkali solution and precipitating by means of an acid. The yield is about 130 parts by weight of α-naphthol.

If the above named mixture is treated in the same manner after adding 1 part of selenium or 1 part of arsenious oxide or 1 part of finely divided tin or 1 part of zinc oxide and 3 parts of diphenylguanidine, a yield of α-naphthol approximating the theoretical value may be obtained.

I claim:

1. The new process which comprises heating α-ketotetrahydronaphthalene with sulphur, the amount of sulphur not exceeding the molar amount calculated upon the amount of the α-ketotetrahydronaphthalene.

2. The new process which comprises heating α-ketotetrahydronaphthalene with sulphur to a temperature of about 200° C., the amount of sulphur not exceeding the molar amount calculated upon the amount of the α-ketotetrahydronaphthalene.

3. The new process which comprises heating α-ketotetrahydronaphthalene with sulphur to a temperature of about 200° C., in the presence of an organic catalyst selected from the group consisting of diphenylguanidine, mercaptobenzothiazole, hexamethylenetetramine and other condensation products of aldehydes and amino compounds.

In testimony whereof, I affix my signature.

EMIL LAAGE.